United States Patent [19]

Danielson

[11] Patent Number: 5,390,660
[45] Date of Patent: Feb. 21, 1995

[54] PRE-WIRED AND PRE-PLUMBED MODULE FOR USE WITH AN INSTALLED HYDRONIC RADIANT FLOOR HEATING SYSTEM

[75] Inventor: Rick E. Danielson, Omaha, Nebr.

[73] Assignee: System Sense, Inc., Sioux Falls, S. Dak.

[21] Appl. No.: 48,113

[22] Filed: Apr. 14, 1993

[51] Int. Cl.[6] .............................................. F23L 9/00
[52] U.S. Cl. ................................ 126/271.2 R; 237/56; 237/57; 237/69
[58] Field of Search ..................... 126/271.2 R, 271.1; 237/56, 57, 69; 165/47, 45, 49, 50, 53

[56] References Cited

U.S. PATENT DOCUMENTS

| | | | |
|---|---|---|---|
| 3,568,924 | 3/1971 | Chenault | 237/69 X |
| 4,646,818 | 3/1987 | Ervin, Jr. | 126/271.1 X |
| 4,880,051 | 11/1989 | Ohashi | 126/271.1 X |
| 5,181,655 | 1/1993 | Bruckelmyer | 165/45 X |

FOREIGN PATENT DOCUMENTS 213745  10/1985  Japan .................................... 237/56

Primary Examiner—Larry Jones
Attorney, Agent, or Firm—Zarley, McKee, Thomte, Voorhees & Sease; Dennis L. Thomte

[57] ABSTRACT

A pre-wired and pre-plumbed module for connection to an installed hydronic radiant floor heating system including a supporting frame having components mounted thereon such as a boiler, pumps, four-way valve, in-line air separator, expansion tank, P/T ports, return valves, supply valves and control panels mounted thereon. The module is assembled at the factory and is tested at the factory to ensure that the components are properly plumbed and wired. Once the module is delivered to the job site, the components of the module are quickly and easily connected to the hydronic radiant floor heating system.

3 Claims, 2 Drawing Sheets

PRE-WIRED AND PRE-PLUMBED MODULE FOR USE WITH AN INSTALLED HYDRONIC RADIANT FLOOR HEATING SYSTEM

BACKGROUND OF THE INVENTION

1. Field of the Invention

This invention relates to a hydronic radiant floor heating system and more particularly to a pre-wired and pre-plumbed module which may be transported to the job site and quickly and easily connected to the installed hydronic radiant floor heating system at the job site.

2. Description of the Related Art

Hydronic radiant floor heating systems have been used for decades. The conventional systems normally include a network of copper or metal pipes or tubes located in the floor or slab of a building. The hydronic radiant floor heating systems of times past met with limited success since the copper tubing and metal pipes had a tendency to corrode and fail after a period of time.

In recent years, the copper or metal tubing of the conventional floor systems has been replaced with a flexible rubber-like tubing manufactured by Goodyear. The tubing manufactured by Goodyear has resulted in a re-birth of hydronic radiant floor heating systems. However, problems still exist with the installation of the systems. In the conventional method of installing a system, the network of tubing is first placed on the surface upon which the floor or slab will be placed. The ends of the tubes normally terminate in a manifold located where the control components for the system will be located. The floor or slab is then installed over the network of tubes. Heretofore, the various components of the system such as the boiler, pumps, valves, in-line air separators, expansion tank, gage, reducing valve, P/T ports, return valves, supply valves and control panel were then delivered to the job site for assembly. The assembly of the various components proved to be difficult for the contractor and frequently required that the provider of the components be present at the job site to assist the plumber in making the plumbing connections and then return to the job site to assist the electrician to make the necessary electrical connections for the system once the plumber has completed the plumbing phase of the installation.

Further, once the components were assembled at the job site, it was necessary to test those components and in many cases, leaks and improper wiring were detected which resulted in delays at the job site.

SUMMARY OF THE INVENTION

A pre-wired and pre-plumbed module for use with an installed hydronic radiant floor heating system is described wherein the installed system includes at least one fluid inlet and at least one fluid outlet connected to the network of tubing located in the floor. A portable support frame is provided which is easily transported from the factory to the job site and which is designed to pass through conventional doorways. The various components of the radiant floor heating system are mounted on the portable frame and are pre-wired and are pre-plumbed to facilitate the ease of installation at the job site. Further, since the various components of the system have been pre-wired and pre-plumbed, the system may be tested at the factory to ensure that there are no leaks in the system and that the system has been properly wired. Once at the job site, the components of the module may be quickly and easily connected to a source of make-up water, the fluid supply and fluid return lines of the floor tubing, a source of natural gas if the boiler is gas-fired, and a source of electrical energy for connection to the electrical control panel.

It is therefore a principal object of the invention to provide a pre-wired and pre-plumbed module for use with an installed hydronic radiant floor heating system.

A further object of the invention is to provide a pre-wired and pre-plumbed module for use with an installed hydronic radiant floor heating system wherein the module may be easily transported to a job site and quickly and easily connected to the installed system.

Still another object of the invention is to provide a pre-wired and pre-plumbed module for use with an installed hydronic radiant floor heating system which has been pre-tested at the factory.

Still another object of the invention is to provide a pre-wired and pre-plumbed module which requires a minimum of installation effort.

These and other objects of the present invention will be apparent to those skilled in the art.

DESCRIPTION OF THE PREFERRED EMBODIMENT

Figure 1:
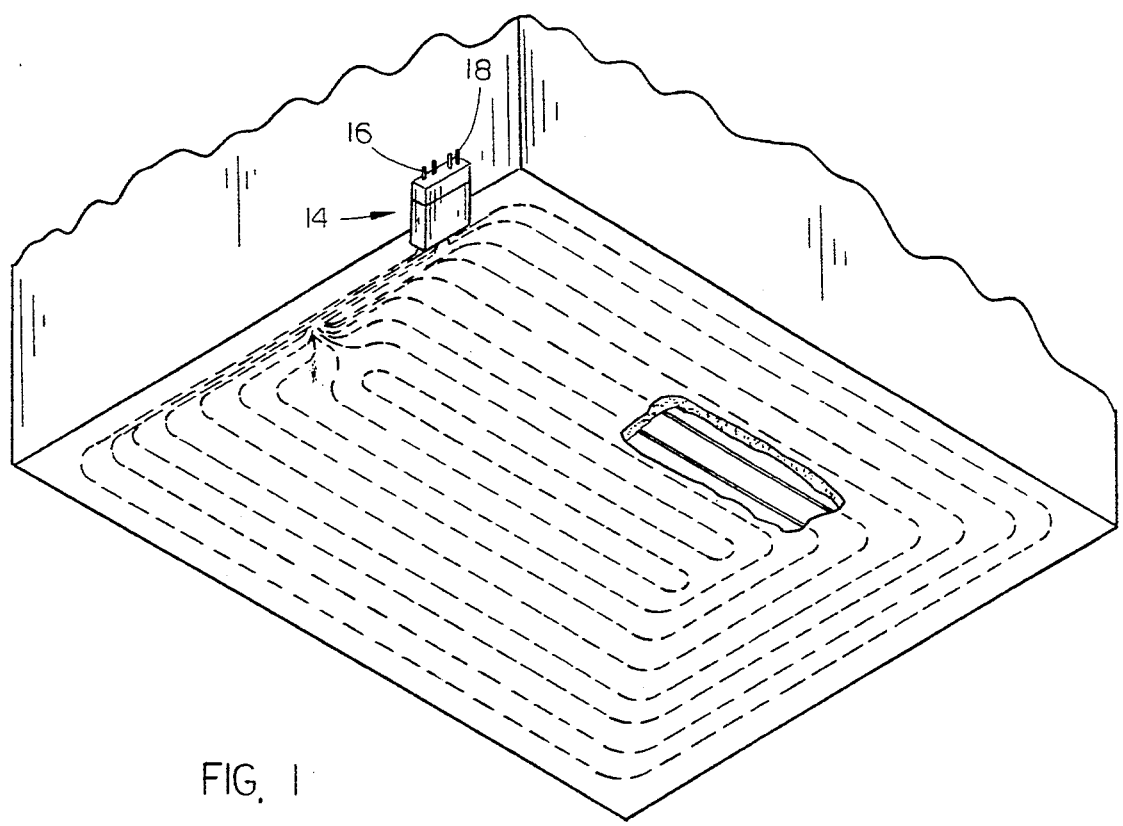
FIG. 1 is a perspective view of a hydronic radiant floor heating system.
Figure 2:
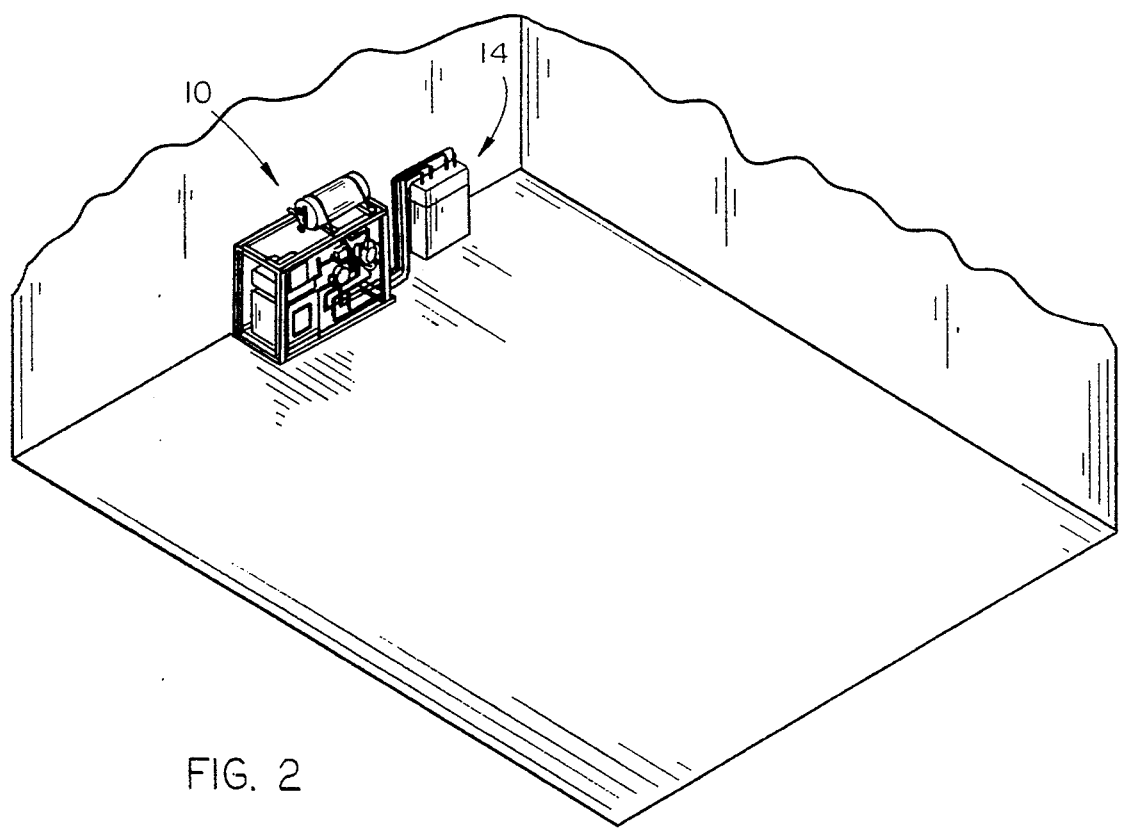
FIG. 2 is a perspective view illustrating the module of this invention having been connected to the system of FIG. 1.
Figure 3:
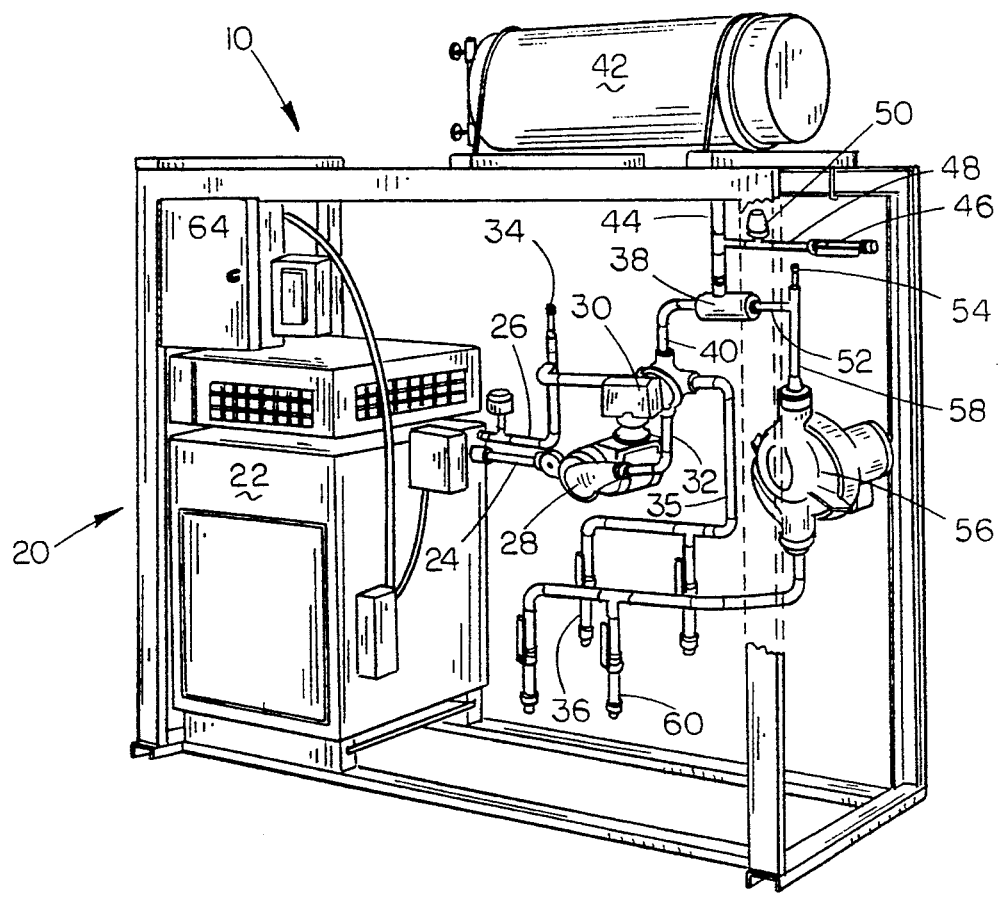
FIG. 3 is a perspective view of the module of this invention.
Figure 4:
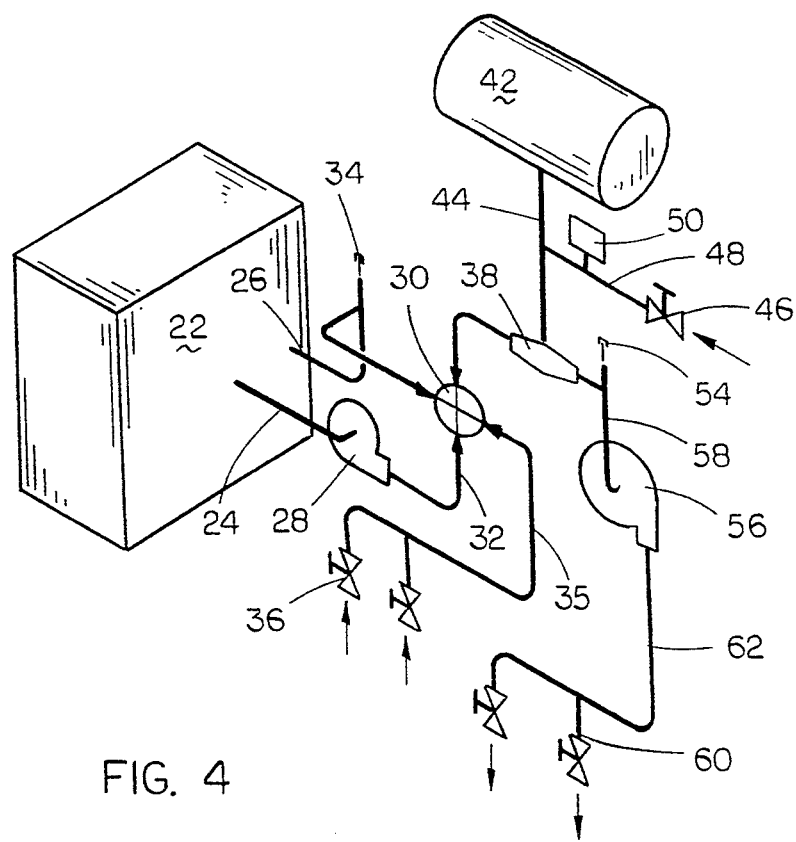
FIG. 4 is a schematic view of the components of the module.

The numeral 10 refers to the module of this invention which is designed to be quickly and easily connected to a hydronic radiant floor heating system 12 such as schematically illustrated in FIG. 1 and including a manifold 14 which has at least one fluid inlet line 16 and at least one fluid discharge line 18. It should be understood that the module 10 may be connected to other types of radiant heating systems such as snow melting and ice prevention systems, air handling systems, finned-tube radiant heating systems and unit heaters. Further, the module may be modified so as to be connected to a system wherein chilled water is passed through a cooling system. Regardless of the type of system, the primary object of the module is to enable the components of the system to be conveniently mounted on a movable frame with the components being pre-wired, pre-plumbed, and pre-tested prior to delivery to the job site. Once at the job site, the module is placed into position and installed as will be described in more detail hereinafter.

Module 10 includes a frame 20 which preferably has a width of 30 inches or less to enable the module to pass through a conventional doorway. A hydronic energy source such as a gas fired TELEDYNE LAARS boiler 22 is mounted on frame 20 and has fluid inlet and outlet lines or pipes 24 and 26 associated therewith respectively. Outlet line 24 is connected to pump 28 which is connected to a TEKMAR four-way valve 30 by line 32. Line 26 is connected to a P/T port 34 which is connected to valve 30. Line 35 extends from valve 30 and has at least one return coupling valve 36 provided thereon. Valve 30 is connected to an in-line air separator 38 by line 40. Separator 38 is connected to an expansion tank 42 by line 44. Line 44 has a coupling valve 46 connected thereto, by line 48, to enable make-up water or fluid to be supplied to the system. A pressure reducing valve 50 is imposed in the line 48 to enable the pressure of the make-up water or fluid to be controlled.

Line 52 extends from separator 38 to P/T port 54 which is connected to a secondary pump 56 by line 58. Pump 56 is connected to at least one supply coupling valve 60 by line 62.

Control panel 64 is mounted on frame 20 and is electrically connected to the boiler 22, pump 28, four-way valve 30, and pump 56 to control the operation thereof.

The various components of the module are pre-wired and pre-plumbed at the factory and are tested at the factory to ensure that there are no leaks in the system and to ensure that the components are properly wired. The module, after having been pre-wired, pre-plumbed and tested, is shipped to the job site where the floor system has been installed. The module is easily moved to the desired location at the job site and is designed to pass through conventional doorways. Once the module 10 has been positioned adjacent the manifold 14, the valve or valves 36 are connected to the return lines of the floor system. The valve or valves 60 of the module 10 are connected to the supply lines of the floor system. Valve 46 is connected to a source of make-up water or fluid and the boiler 22, if gas-fired, is connected to a source of gas. Control panel 64 is electrically connected to a source of electrical power and the entire system is ready to be operated. Thus it can be seen that a novel module has been provided which enables the various components for the hydronic radiant floor heating system to be pre-wired and pre-plumbed at the factory and tested at the factory and then delivered to the job site for quick and easy connection to the installed floor system.

Although the module 10 has been described as being of the radiant heating type, it should be understood that the module could also include components for supplying chilled water to a network of pipes or tubes located in a floor structure. Further, the module 10 could be operatively connected to snow melting and ice prevention systems, air handling systems, finned-tube radiant heating systems or unit heaters. Additionally, certain of the components which have been described as being on the module 10 may not be needed in some installations but have been described since they normally will be included on the module 10.

Thus it can be seen that the invention accomplishes at least all of its stated objectives.

I claim:

1. A pre-wired and pre-plumbed module capable of being moved as an assembled package to a job site for connection to an installed hydronic radiant floor heating system including a manifold having at least one fluid supply line and at least one fluid return line comprising, a portable support frame, a fluid heater on said support frame having a fluid supply line and a fluid return line connected thereto, a first pump means on said support frame fluidly connected to said fluid supply line of said fluid heater, a four-way valve on said frame having first, second, third and fourth ports, said first port being fluidly connected to said first pump, said second port being fluidly connected to said return line of said fluid heater, at least one fluid return valve on said frame fluidly connected to said fourth port, at least one fluid supply valve on said frame, a first fluid line connecting said fluid supply line and said third port, a second pump imposed in said first fluid line, an expansion tank on said frame fluidly connected to said first fluid line, a fluid make-up valve operatively connected to said first line, an in-line air separator imposed in said first line, an electronic control panel mounted on said frame and being electrically connected to at least said fluid heater, said first pump, said four-way valve and said second pump for controlling the operation thereof, said quick fluid return valve being adapted for connection to said fluid return line, said fluid supply valve being adapted for quick connection to said fluid supply line, said fluid make-up valve being adapted for quick connection to a source of fluid at the job site, said electronic control panel being adapted for connection to a source of electrical power at the job site.

2. A pre-wired and pre-plumbed module capable of being moved as an assembled package to a job site for connection to an installed hydronic radiant floor heating system including at least one fluid supply line and at least one fluid return line comprising, a portable support means, a hydronic energy source on said portable support frame, a first pump means on said support frame fluidly connected to said hydronic energy source for pumping fluid through the installed system, value means on said frame operatively connected to said hydronic energy source and said pump for controlling the flow of fluid through the system, a means on said support means operatively connected to said hydronic energy source, said pump and said valve means for quick connection to said fluid supply line and said fluid return line of the installed system, and control means on said portable support frame for controlling certain of the components on said frame.

3. The method of installing a hydronic radiant floor heating system in the floor or slab of a building, comprising the steps of:

placing a network of tubing on the surface upon which the floor or slab of the building will be placed;

connecting the terminal ends of the tubing to a manifold;

placing the floor or slab on the tubing;

pre-wiring and pre-plumbing a control module;

moving the pre-wired and pre-plumbed control module to the building site;

and connecting the pre-wired and pre-plumbed control module to the manifold.

* * * * *